(12) United States Patent
Bucur

(10) Patent No.: US 7,202,634 B2
(45) Date of Patent: *Apr. 10, 2007

(54) VOLTAGE MODE, HIGH ACCURACY BATTERY CHARGER

(75) Inventor: Constantin Bucur, Santa Clara, CA (US)

(73) Assignee: O2Micro International Limited, Georgetown Grand Cayman (KY)

(*) Notice: Subject to any disclaimer, the term of this patent is extended or adjusted under 35 U.S.C. 154(b) by 298 days.

This patent is subject to a terminal disclaimer.

(21) Appl. No.: 10/757,871

(22) Filed: Jan. 15, 2004

(65) Prior Publication Data
US 2005/0189916 A1 Sep. 1, 2005

Related U.S. Application Data

(63) Continuation-in-part of application No. 10/618,901, filed on Jul. 14, 2003, now Pat. No. 6,861,823, which is a continuation of application No. 10/328,466, filed on Dec. 23, 2002, now Pat. No. 6,611,129, which is a continuation of application No. 09/948,828, filed on Sep. 7, 2001, now Pat. No. 6,498,461.

(60) Provisional application No. 60/313,260, filed on Aug. 17, 2001.

(51) Int. Cl.
*H01M 10/44* (2006.01)
*H01M 10/46* (2006.01)

(52) U.S. Cl. ..................... 320/137

(58) Field of Classification Search .......... 320/137, 320/139, 141
See application file for complete search history.

(56) References Cited

U.S. PATENT DOCUMENTS

| 4,621,313 A | 11/1986 | Kiteley ................... 363/49 |
| 5,623,197 A * | 4/1997 | Roseman et al. ........ 320/134 |
| 5,698,964 A | 12/1997 | Kates et al. ............. 320/22 |
| 5,723,970 A | 3/1998 | Bell ......................... 320/30 |

(Continued)

FOREIGN PATENT DOCUMENTS

JP S48003671 1/1973

(Continued)

OTHER PUBLICATIONS

Japanese Office Action, with English translation, from related Japanese application (5 pgs).

(Continued)

*Primary Examiner*—Edward H. Tso
(74) *Attorney, Agent, or Firm*—Grossman, Tucker, Perreault & Pfleger PLLC

(57) ABSTRACT

A circuit for controlling a charging parameter provided to a rechargeable battery. The circuit includes a power control circuit configured to provide a power control signal representative of a power output level of a DC source, and a control signal generating circuit configured to reduce the charging parameter provided to the battery if the power output level exceeds a predetermined power threshold level. An electronic device having such a circuit and a method is also provided. The circuit may be used with a DC source that supplies power to recharge a rechargeable battery. The DC source may have a non-fixed output voltage level such as from a controllable DC source or a variable DC source.

16 Claims, 12 Drawing Sheets

U.S. PATENT DOCUMENTS

| | | | |
|---|---|---|---|
| 5,883,504 A | 3/1999 | Okada | |
| 5,912,549 A | 6/1999 | Farrington et al. | 323/207 |
| 5,920,475 A | 7/1999 | Boylan et al. | 363/127 |
| 5,932,994 A | 8/1999 | Jo et al. | |
| 6,140,801 A | 10/2000 | Aoki et al. | |
| 6,184,660 B1 | 2/2001 | Hatular | 320/141 |
| 6,351,110 B1 | 2/2002 | Pappalardo et al. | 323/285 |
| 6,369,561 B1 | 4/2002 | Pappalardo et al. | 323/285 |
| 6,396,716 B1 | 5/2002 | Liu et al. | 363/17 |
| 6,498,461 B1 | 12/2002 | Bucur | 320/145 |

FOREIGN PATENT DOCUMENTS

| | | |
|---|---|---|
| JP | H01154474 | 10/1989 |
| JP | H07177681 | 7/1995 |
| JP | 07307166 | 11/1995 |
| JP | 20020287383 | 10/2000 |
| JP | 2002247779 | 8/2002 |

OTHER PUBLICATIONS

English translation of Taiwan Office Action date Jul. 6, 200.

Japanese Office Action "Notice of Reasons for Rejection" dated May 17, 2006 with English translation (9 pages).

Chinese Office Action from related Chinese application, dated Oct. 13, 2006, with English translation (15 pgs).

* cited by examiner

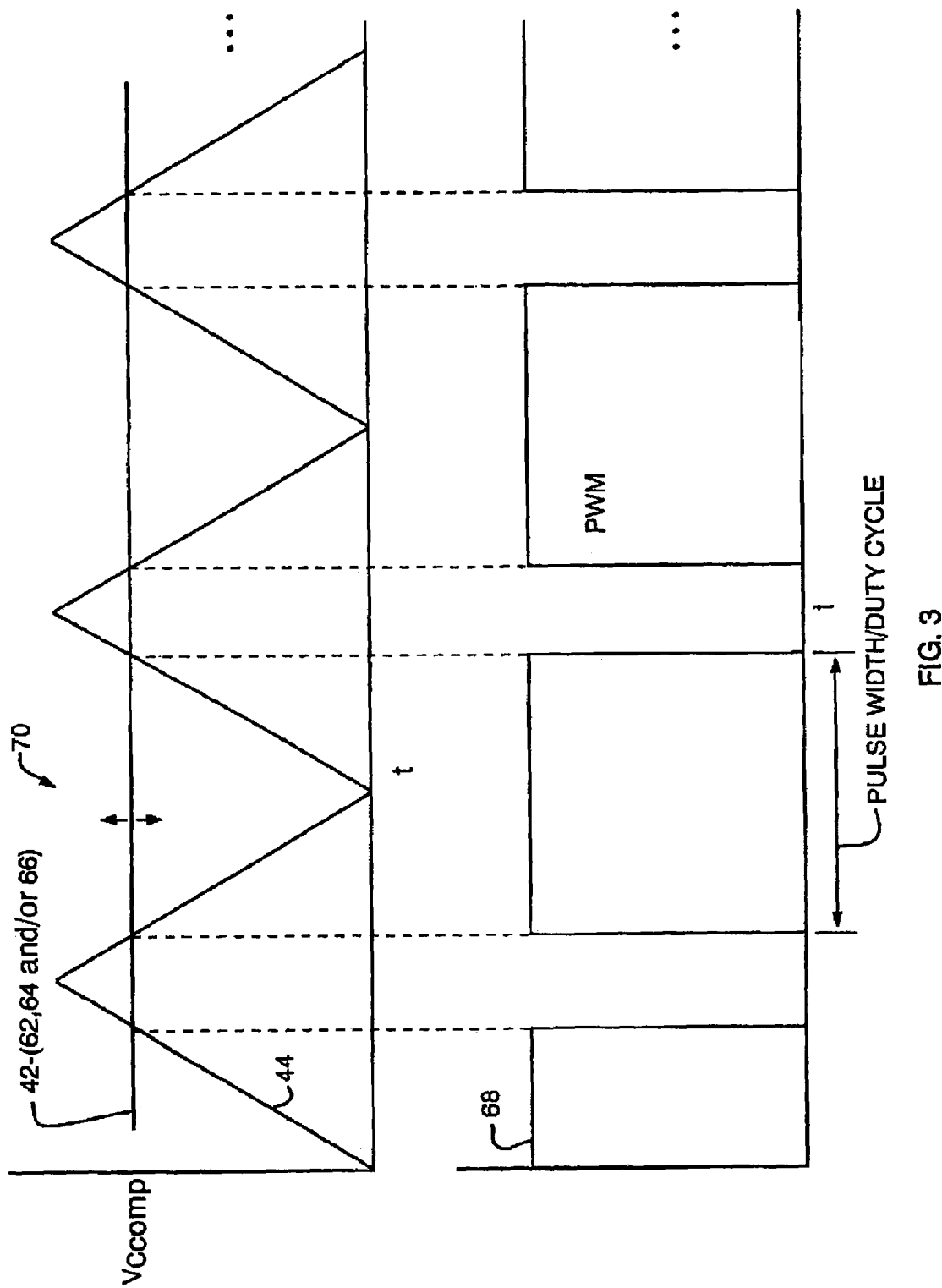

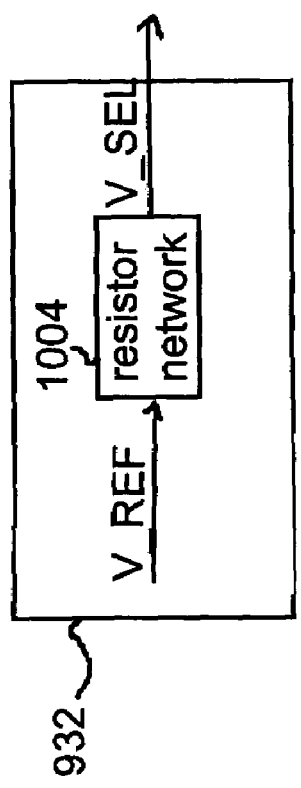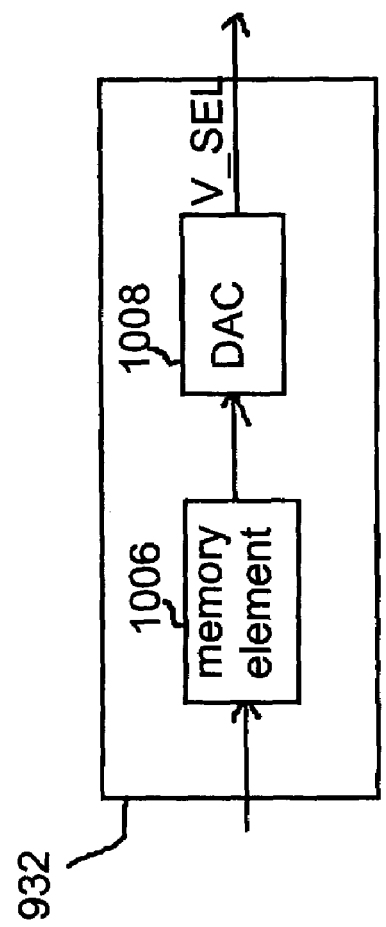
FIG. 10A
FIG. 10B

VOLTAGE MODE, HIGH ACCURACY BATTERY CHARGER

CROSS REFERENCE TO RELATED APPLICATIONS

This application is a continuation-in-part application of U.S. Nonprovisional application Ser. No. 10/618,901 filed Jul. 14, 2003, now U.S. Pat. No. 6,861,823 which itself is continuation of U.S. Nonprovisional application Ser. No. 10/328,466 filed Dec. 23, 2002, now U.S. Pat. No. 6,611,129, which itself is a continuation of U.S. Nonprovisional application Ser. No. 09/948,828 filed Sep. 7, 2001, now U.S. Pat. No. 6,498,461, all the teachings of which are incorporated herein by reference, and claims the benefit of the filing date of U.S. Provisional Application Ser. No. 60/313,260 filed Aug. 17, 2001, the teachings of which are also incorporated herein by reference.

FIELD OF THE INVENTION

The present invention relates to power systems for electronic devices, and in particular to a power management circuit for managing and limiting an output power level provided to a rechargeable battery.

BRIEF DESCRIPTION OF THE DRAWINGS

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

FIG. 3 is a timing diagram representing an oscillator signal and DC signal to generate a PWM signal of the system of FIG. 1;

FIGS. 10A and 10B are diagrams of exemplary embodiments of selectable voltage threshold circuits of the presence circuit of FIG. 9.

DETAILED DESCRIPTION OF EXEMPLARY EMBODIMENTS

Figure 1:
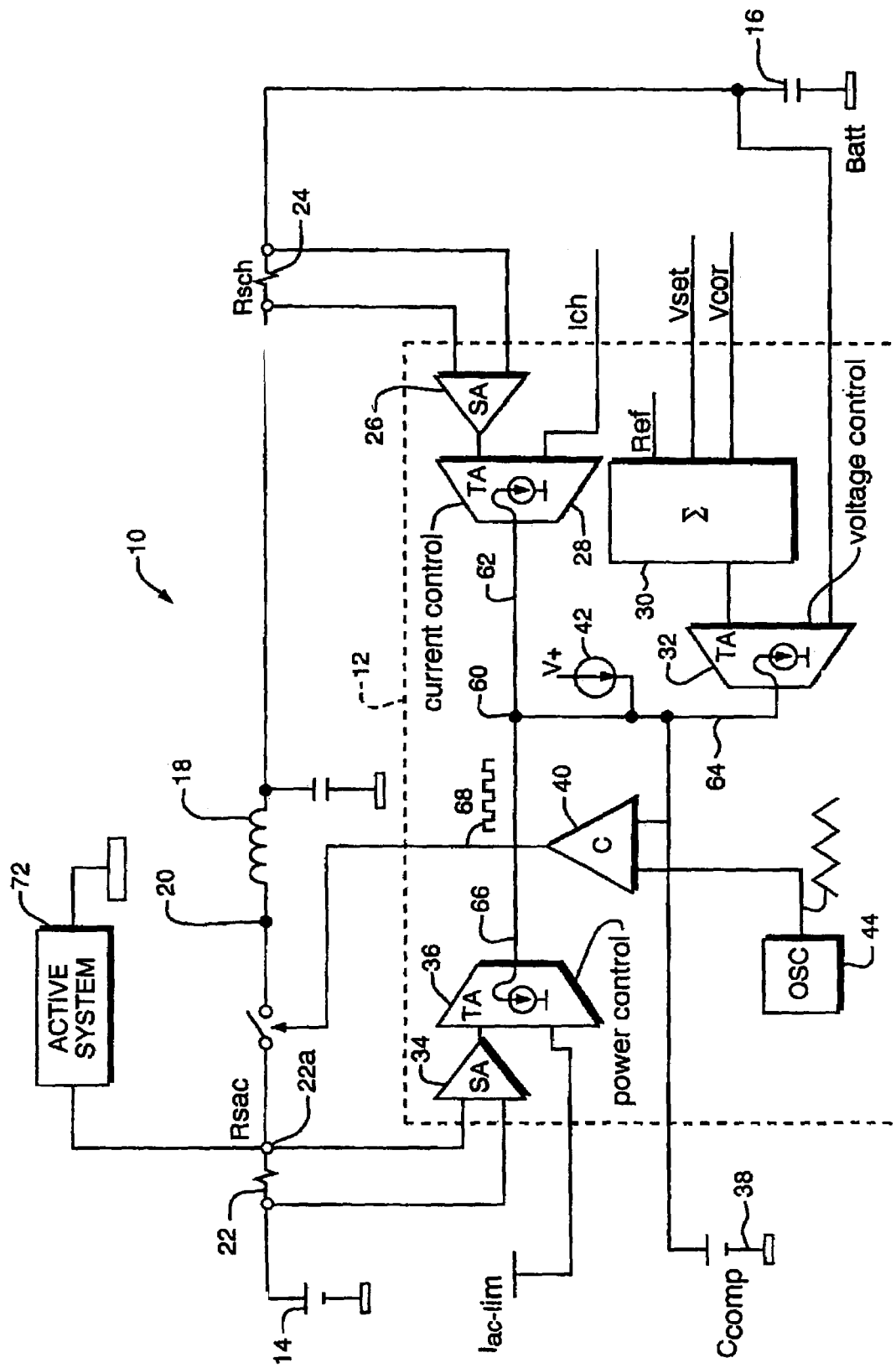
FIG. 1 is a block diagram of an exemplary battery cell charging system according to the present invention.

FIG. 1 depicts a voltage mode battery charger system 10 according to one exemplary embodiment. The system 10 includes a voltage mode battery charger circuit 12 for charging one or more batteries 16 using a DC source 14. The DC source may be an AC/DC adapter or other power supply. Circuit 12 operates to control the duty cycle of the Buck converter circuit 18 (comprising an inductor and capacitor, as is well understood in the art) via switches 20, to control the amount of charging power delivered to the battery 16. As an overview, circuit 12 controls the duty cycle of the Buck converter 18 by monitoring the source current, the battery charging current (current mode) and the battery voltage (voltage mode). Battery charging current is sensed across the sense resistor (or impedance) Rsch. Instead of sensing the current through the inductor (as in conventional current mode topologies), the present invention uses a voltage mode topology by sensing the current across Rsch. In this manner, and by utilizing both battery current control and voltage, the present invention achieves more accurate charging of the battery towards the end of the charging cycle, and provides more accurate charge termination than can be achieved with conventional current mode charging topologies. The details of the system 10 are described below.

Essentially, the charger circuit 12 operates to control the duty cycle of the buck converter 18 by controlling the power on the compensation capacitor Ccomp 38. The circuit 12 includes a battery current control section comprised of sense amplifier 26 and transconductance amplifier 28, a battery voltage control section comprised of summing block 30 and transconductance amplifier 32, and a power control section comprised of sense amplifier 34 and transconductance amplifier 36. The battery current control section and battery voltage control section each generate signals indicative of the battery current and voltage, respectively. The power control section generates a signal indicative of the power available from the source 14. Each of these sections is combined (at node 60), and if any of these sections exceeds a threshold, the power delivered to the charge capacitor decreases, thereby reducing the duty cycle of the Buck converter. This operation is described in greater detail below.

The duty cycle of the Buck converter 18 is controlled by the comparator 40, via switches 20. The input of the comparator 40 is the voltage on the compensation capacitor (Ccomp) 38 and a sawtooth signal generated by the oscillator 44. The output of the comparator 40 is a PWM signal 68, whose pulse width (duty cycle) is reflected in the intersection of the amplitude of the voltage on Ccomp 38 and the sawtooth signal. In this sense, the duty cycle of the PWM signal thus generated is based on the voltage on the compensation capacitor 38 and the sawtooth signal generated by the oscillator 44. "Based on", as used herein, is to be interpreted broadly and generally means "as function of" or "related to". The higher the amplitude of the voltage on Ccomp, the greater the duty cycle of the PWM signal 68. In the exemplary embodiment, the sawtooth signal is a fixed frequency signal, and the duty cycle of the PWM is therefore adjusted by adjusting the amplitude of the voltage on Ccomp 38. Ccomp 38 is charged by the current source 42. When no signal is generated by any of the current control section, the voltage control section or the power control section, the current source charges Ccomp to maximum level, and thus the PWM is at maximum duty cycle and the Buck converter is delivering maximum charging current and voltage to the battery. Any signal generated by the current control section, the voltage control section or the power control section acts as a sink to the compensation capacitor 38, thereby reducing the voltage on the compensation capacitor and thereby reducing the duty cycle of the PWM signal. In this manner, charging current is controllably delivered to the battery 16. The particulars of the Buck converter 18 and switches 20 are well understood in this art, and are not important to the present invention, and may be generalized as a controllable DC/DC converter circuit.

Current Control

The current control section (circuit) includes a sense amplifier 26 and a transconductance amplifier 28. The sense amplifier monitors the battery charging current across the sense impedance Rsch 24, and generates a signal proportional to battery charge current. The transconductance amplifier 28 receives the output of the sense amplifier 26 and compares that signal with a programmed (desired) battery current signal Ich. As a general matter, the inputs of the transconductance amplifier 28 are voltage signals, and the output is a proportional current signal. The output of the transconductance amplifier is the current control signal 62, which is proportional to the amount the battery charging current exceeds the programmed Ich. Ich is zero until the battery charging current exceeds the programmed current value Ich. The programmed value Ich is set to according to the particular battery type and requirements, for example set to charge a conventional LiIon battery, as is well understood in the art.

If the battery charging current exceeds the threshold Ich, the amplifier 28 generates a proportional current control signal 62. Since the output of the amplifier is coupled to the negative side of the current source 42 (at node 60), any signal generated by the amplifier 28 acts to sink current from the source 42. In turn, this operates to reduce the voltage on Ccomp 38, thereby reducing the duty cycle of the PWM signal 68 and reducing the charging current delivered to the battery. Since the output current control signal 62 is proportional to the input values, the duty cycle is dynamically adjusted as a function of battery charging current.

Figure 2:
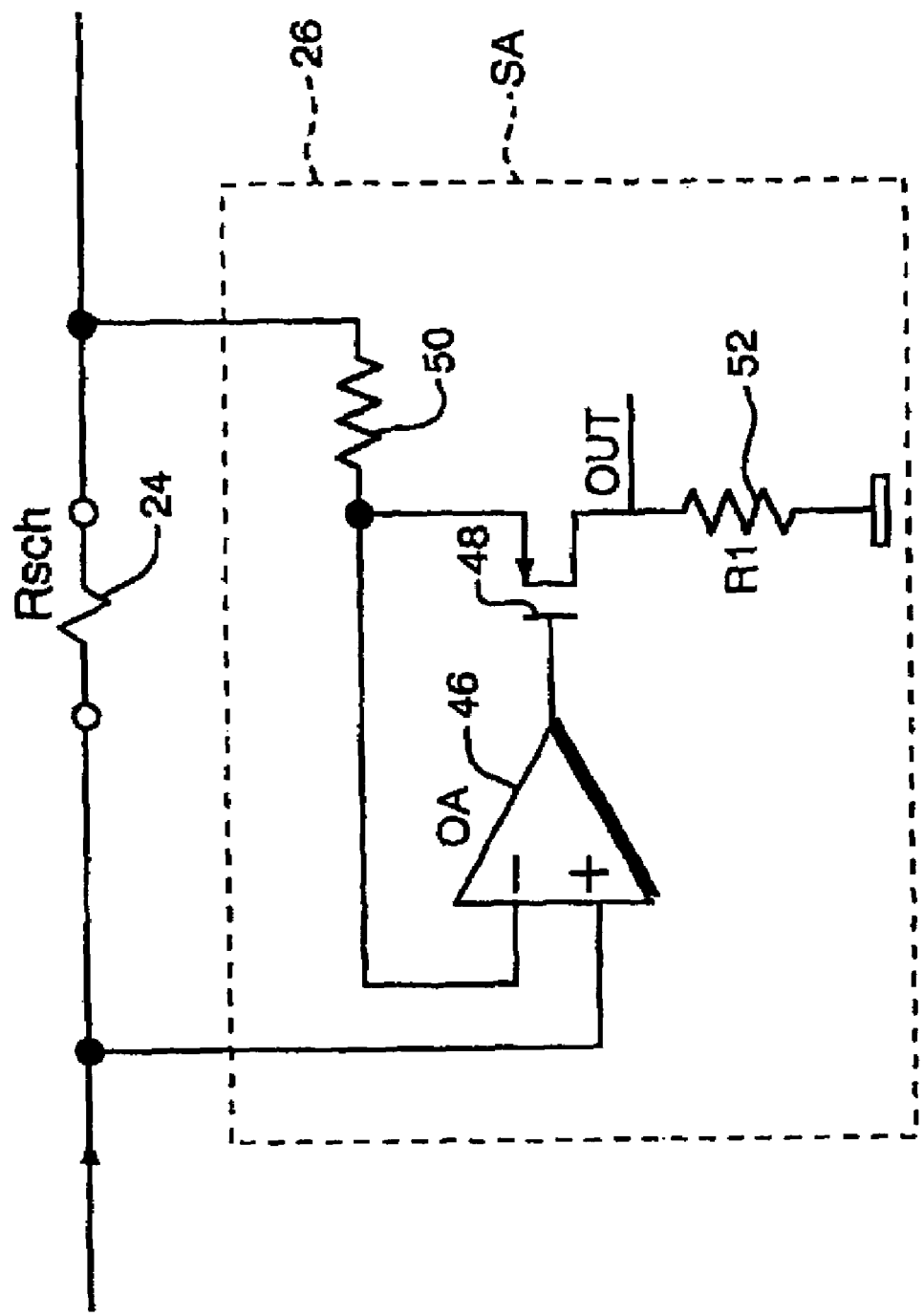
FIG. 2 is an exemplary amplifier circuit of the present invention.

The current sense amplifier 26 may be a custom or off-the-shelf amplifier, as is readily available in the art. However, as is also understood in the art, amplifier 26 must provide large common mode voltage rejection. Accordingly, and referring now to FIG. 2, another aspect of the present invention is an amplifier configuration to alleviate the requirement for large common mode voltage rejection. The sense amplifier 26 depicted in FIG. 2 includes a switch 48 controlled by an operational amplifier 46, and gain resistors R1 50 and R2 52. The amplifier 26 of FIG. 2 is not sensitive to common mode voltage. Rather, the switch transfers the floating differential voltage that appears across Rsch by referring it to ground and amplifying the voltage according to the gain given by R2/R1.

Voltage Control

The voltage control section (circuit) includes the summing block 30 and a transconductance amplifier 32. In the exemplary embodiment, the summing block 30 includes three inputs: a high-precision reference or trim voltage Ref, a voltage set (Vset) and a voltage correction (Vcor) signal. In the exemplary embodiment, the battery 16 is a LiIon battery. LiIon batteries are very sensitive to overvoltage conditions, and indeed become hazardous if overcharged. Thus, the reference or trim signal Ref is accurate to within the tolerance required by the battery. For LiIon, the tolerance is on the order of +/−0.005 Volts. However, other battery types and reference voltage requirements are equally contemplated herein. Vset represents a voltage setting value, usually supplied by the manufacturer of the battery. Vcor is a correction signal that is proportional to the charging current, and is provided as a compensation signal for the particulars of the charging apparatus and for parasitic resistance associated with the battery (since battery voltage cannot be measured directly, and one must factor in parasitic resistance). Although not shown, Vcor can be obtained by tapping a voltage divider placed in parallel with the output of sense amplifier 26. These three signals are summed in a weighted fashion in summing block 30. For example, the output of the summing block 30 can be set to the reference voltage+(Vset/x)+(Vcor/y); where x and y are chosen in accordance with the desired voltage setting value and correction value, respectively. Vcor and Vset need not be as accurate as the reference voltage, since their contribution is divided diminished by x and y.

The output weighted voltage signal from the summer block 30 may be generally deemed as a predetermined battery voltage threshold signal. The transconductance amplifier 32 compares the output of the summer block to the battery voltage. The output of the amplifier 32 is a voltage control signal 64, which is proportional to the amount the battery voltage exceeds the threshold established by the summing block. As with the current control section described above, signal 64 is nonzero if the battery voltage exceeds the threshold determined by the summer block. Since the output of the amplifier 32 is coupled to the negative side of the current source 42 (at node 60), any signal 64 generated by the amplifier 32 acts to sink current from the source. In turn, this operates to reduce the voltage on Ccomp 38, thereby reducing the duty cycle of the PWM signal 68 and reducing the charging current delivered to the battery. Since the output 64 of the amplifier 32 is proportional to the input values, the duty cycle is dynamically adjusted to achieve a desired battery voltage.

Power Control

The power control section (circuit) includes a sense amplifier 34 and a transconductance amplifier 36. The power control section is provided to reduce the duty cycle of the Buck converter, and thereby reduce the charging current delivered to the battery if the DC source needs to deliver more power to an active system 72 (e.g., portable electronic device) attached to the source. The active system is coupled in parallel to the charging system 10 across the sense resistor Rsac. Since the total amount of power provided by the source 14 is fixed, in a well-designed system the load requirements of the active system and battery charging circuit are balanced. The power control section ensures that the active system always takes priority (in terms of power requirements) by reducing the charging current to meet the demands of the active system. Accordingly, the power control section generates a power control signal 66 proportional to the amount of power required by the battery charger and the active system exceeds the threshold Iac_μm. Iac_μm is typically the maximum that can be delivered by the adapter source 14. For example, the source 14 may be simultaneously supplying power to an active system (not shown) and charging current to the battery. If the portable system requires more power, charging current to the battery is accordingly reduced to meet the demands of the system. The source 14 is generally defined as a DC power source, as may be supplied from an AC/DC adapter. Since the output voltage level provided by the DC source 14 is constant, it is enough to limit the power of the DC source 14 by monitoring and limiting current output of the DC source.

The sense amplifier 34 monitors the total adapter current delivered by the source 14 across the sense impedance Rsac 22. The total adapter (source) current includes the system current (i.e., current delivered to a portable system (not shown) connected to the source 14) and the battery charger circuit 12 (which is a measure of the charging current divided by duty cycle of the Buck converter 18). The signal across the sense resistor Rsac is a signal proportional to the total adapter current. The transconductance amplifier 36 receives the output of the sense amplifier 34 and compares that signal with a power threshold signal Iac_lim. Thus, if the signal across the sense resistor is larger than Iac_lim, this indicates that the system is requiring more power, and accordingly battery charging current is to be reduced. Of course, this limit signal may be fixed, or may be adjusted based on the dynamic power requirements of the system and/or changes in the source. The output of the transconductance amplifier is the power control signal 66, which is zero until the power required by the battery charger and the active system exceeds the threshold value Iac_lim.

If the power required by the battery charger and the active system exceeds the threshold Iac_lim, the amplifier 36 generates a proportional power control signal 66. Since the output of the amplifier is coupled to the negative side of the current source 42 (at node 60), any signal generated by the amplifier 36 acts to sink current from the source. In turn, this operates to reduce the voltage on Ccomp 38, thereby reducing the duty cycle of the PWM signal 68 and reducing the charging current delivered to the battery. Since the output 66 of the amplifier 36 is proportional to the input values, the duty cycle is dynamically adjusted as a function of balancing power demands between a system and the battery, and so as not to exceed a maximum power output of the DC source 14.

FIG. 3 depicts a timing diagram 70 representing the PWM signal 68 (bottom figure) and the intersection between the voltage on the compensation capacitor, Vccomp, and the sawtooth signal 44 (top figure). In the present exemplary embodiment, Vccomp is essentially a DC signal whose amplitude is moved up by the current source 42, and down by either the current control signal 62, the voltage control signal 64 or the power control signal 66. In other words, the value (amplitude) of Vccomp is the sum of signals (42–(62, 64 and/or 66)). By moving the value of Vccomp downward, the duty cycle of PWM signal is decreased.

Thus, with present invention, the duty cycle of the PWM signal can be adjusted using a differential the compensation capacitor. In the exemplary embodiments, adjusting the PWM is accomplished dynamically as a function of battery charging current, battery voltage and/or system power requirements. The topology depicted in FIG. 1 is a voltage mode topology. Voltage mode topology means that the sense resistor Rsch is placed outside of the Buck converter, and thus the current across this resistor is a DC value (without ripple).

In another embodiment, a power management circuit 12a as further detailed herein may be utilized to control a charging power level provided to a rechargeable battery 16. To do so, the power management circuit 12a may be used to control a controllable DC source directly (FIG. 4A) or a DC to DC converter (FIG. 4B) where the output voltage of the associated DC source in each embodiment may not provide a fixed output voltage level.

Figure 4A:
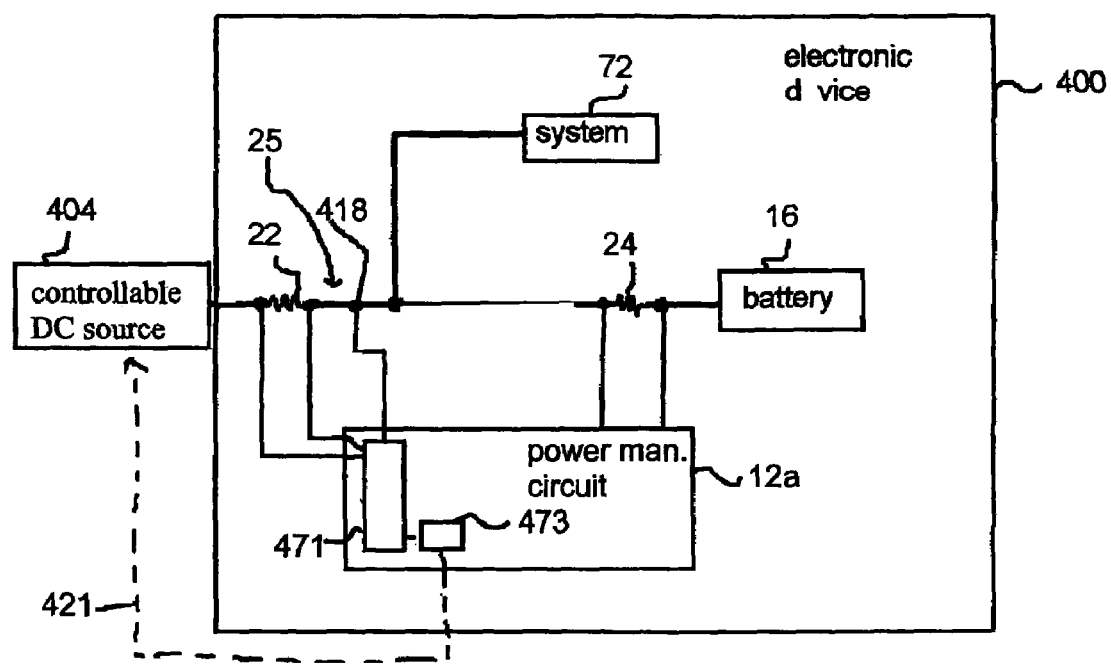
FIG. 4A is a block diagram of an electronic device having a power management circuit consistent with another embodiment where the power management circuit provides a control signal to a controllable DC source.

FIG. 4A illustrates an electronic device 400 having a power management circuit 12a consistent with the invention for controlling a battery charging parameter, e.g., battery charging current and/or voltage, provided to the rechargeable battery 16. In the embodiment of FIG. 4A, this may be done by controlling an output power level of the controllable DC source 404. The electronic device 400 may be any variety of electronic devices including a laptop computer, cell phone, personal digital assistant, and the like. Power from the controllable DC source 404 may be utilized to supply power to the system 72, to the battery 16, or some combination of both in various power supply modes. The battery 16 may include one or a plurality of batteries. A battery 16 may be a rechargeable battery of various types such as lithium-ion, nickel-cadmium, nickel-metal hydride batteries, or the like.

The controllable DC source 404 may be any variety of such sources known in the art, e.g., a controllable ACDC adapter that accepts AC input voltage and provides a controllable DC output voltage based on an appropriate control signal. The control signal may be provided by the power management circuit 12a along path 421. The path 421 from the power management circuit 12a to the controllable DC source 404 may be a separate path utilizing any variety of communication protocols known in the art. For instance, the controllable DC source 404 may be configured with a serial communication interface, e.g., RS232, to receive a serial control signal from the power management circuit 12a. The controllable DC source 404 may alternatively be configured with an analog interface to accept an analog control signal. Alternatively, the separate path 421 may not be necessary. For instance, the control signal from the power management circuit 12a may be modulated onto the power line 25. In such an instance, both the power management circuit 12a and the controllable DC source 404 are adapted with modulation/demodulation circuitry known in the art to generate the feedback control signal that is transposed onto the power line 25.

The power management circuit 12a may include a power control circuit 471 and a control signal generating circuit 473. In general, the power control circuit 471 provides a power control signal to the control signal generating circuit 473 representative of an output power level of the controllable DC source 404. The control signal generating circuit 473 may include a plurality of error amplifiers to compare signals, e.g., the power control signal, with an associated threshold level for each monitored parameter similarly to that previously detailed regarding the circuit 12 of FIG. 1. For instance, the plurality of error amplifiers may be configured as an analog "wired-OR" topology such that the error amplifier that first detects a condition exceeding the associated maximum threshold level controls the command signal to the controllable adapter 404. An appropriate control signal may then be communicated to the controllable DC source 404, e.g., to lessen an output power parameter of the source 404 if a maximum threshold limit is reached.

Figure 4B:
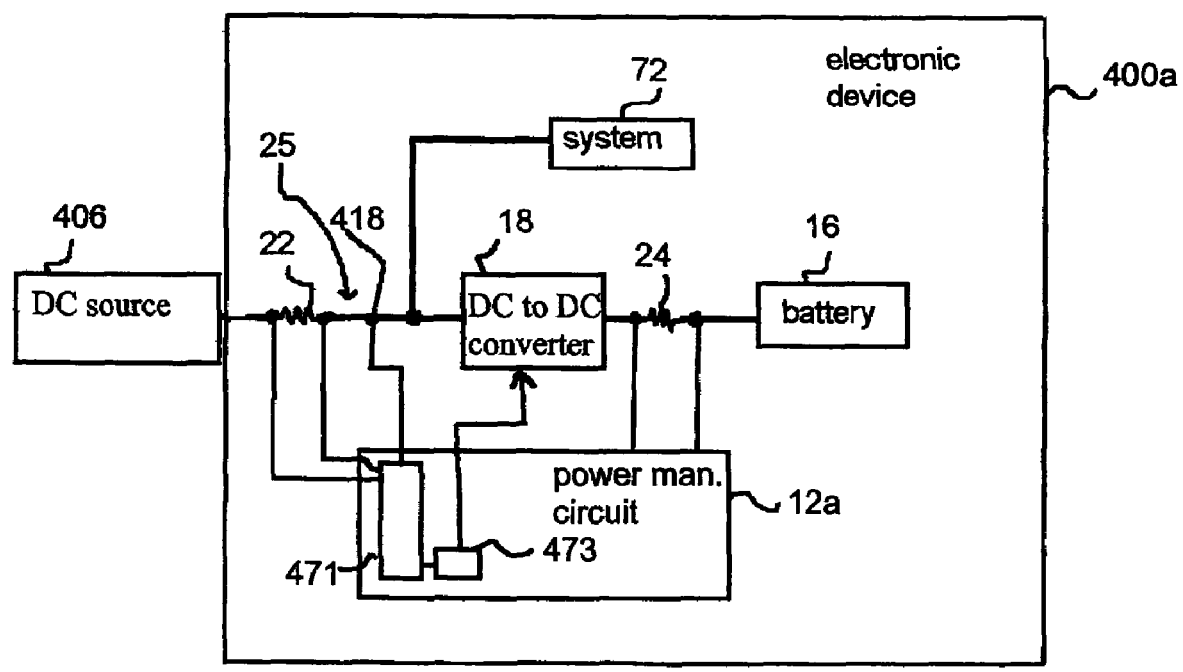
FIG. 4B is a block diagram of another electronic deice having a power management circuit consistent with FIG. 4A where the power management circuit provides a control signal to a DC to DC converter.

FIG. 4B illustrates another embodiment of an electronic device 400a having a power management circuit 12a consistent with the invention for controlling a battery charging parameter, e.g., battery charging current and/or voltage, by controlling a DC to DC converter 18. The DC source 406 provides power to recharge the battery via the DC to DC converter 18. The DC source 406 may have an output voltage level that varies over time. For example, the DC source 406 may be a solar source where the output voltage level varies with light received by the source. The DC source 406 may also be a fuel cell. The DC source 406 may also provide a fixed output voltage level that is different from one that the system anticipated. For instance, a user of the electronic device 400*a* may utilize a fixed voltage output source of 15 volts when the electronic device 400*a* expects a 20 volt source. Advantageously, the power management circuit 12 enables maximum power to be delivered from such DC sources with variable output voltage levels as long as the maximum current output of such sources is not also exceeded.

The control signal generating circuit 473 may provide a control signal to the DC to DC converter 18. The control signal may be a PWM signal 68 as previously detailed and the DC to DC converter 18 may be any variety of DC to DC converters known in the art. Other elements of FIG. 4B and operation thereof are similar to those elements previously detailed regarding FIG. 4A. Hence, similar circuit elements are labeled similarly and any repetitive description of the elements or operation thereof is omitted herein for clarity.

Figure 5A:
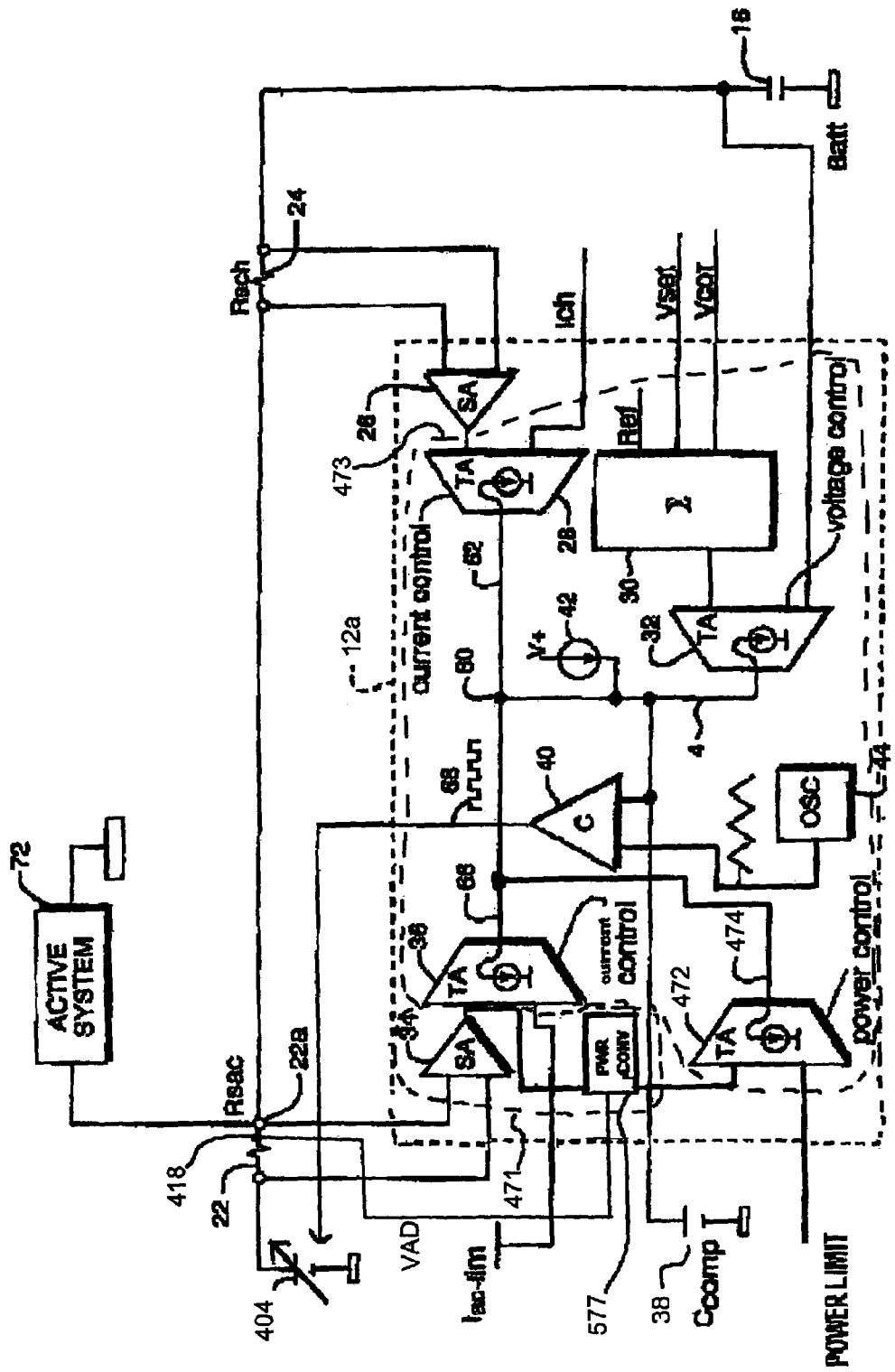
FIG. 5A is a more detailed block diagram of the control signal generating circuit portion of the power management circuit of FIG. 4A.

Turning to FIG. 5A, an exemplary circuit diagram of one embodiment of the power management control circuit 12*a* is illustrated showing details of the control signal generating circuit 473. The control signal generating circuit 473 includes a plurality of error amplifiers 36, 472, 28, 32 to compare various signals to associated threshold levels. Various elements of the control generating circuit 473 and operation thereof are similar to the operation of the circuit 12 previously detailed regarding FIG. 1. Hence, similar circuit elements are labeled similarly and any repetitive description of the elements or operation thereof is omitted herein for clarity.

Because the output of the controllable DC source 404 is variable and not fixed, the control signal generating circuit 473 may include both a current limit error amplifier 36 and a power limit error amplifier 472. The adapter current limit error amplifier 36 compares a signal representative of the current output of the controllable DC source 404 with a current limit Iac-lim. The power limit error amplifier 472 compares a signal representative of the power output of the controllable DC source 404 with a power limit level. The control signal generating circuit 473 will reduce the duty cycle of the PWM control signal provided by comparator 40 if the current limit or power threshold limit is reached. The controllable DC source 404 may then be responsive to the PWM control signal to reduce its output power level in such an instance. The comparator 40 may be replaced by any variety of control circuits responsive to comparing the voltage on the compensation capacitor 38 with the sawtooth signal from oscillator 44 to provide any variety of control signal, e.g., an analog or digital signal, to control the output voltage of the controllable DC source.

The power control circuit 471 may include the sense amplifier 34 coupled to the sense resistor 22 to provide a signal representative of the current output of the controllable DC source 404. The power control circuit 471 may further include a power conversion circuit 577. The power conversion circuit 577 may receive the signal from the output of the sense amplifier 34 representative of the current output of the controllable DC source 404 and another signal VAD representative of the voltage output of the controllable DC source 404 and provide a power control signal to error amplifier 472 representative of the output power level of the controllable DC source 404.

Figure 5B:
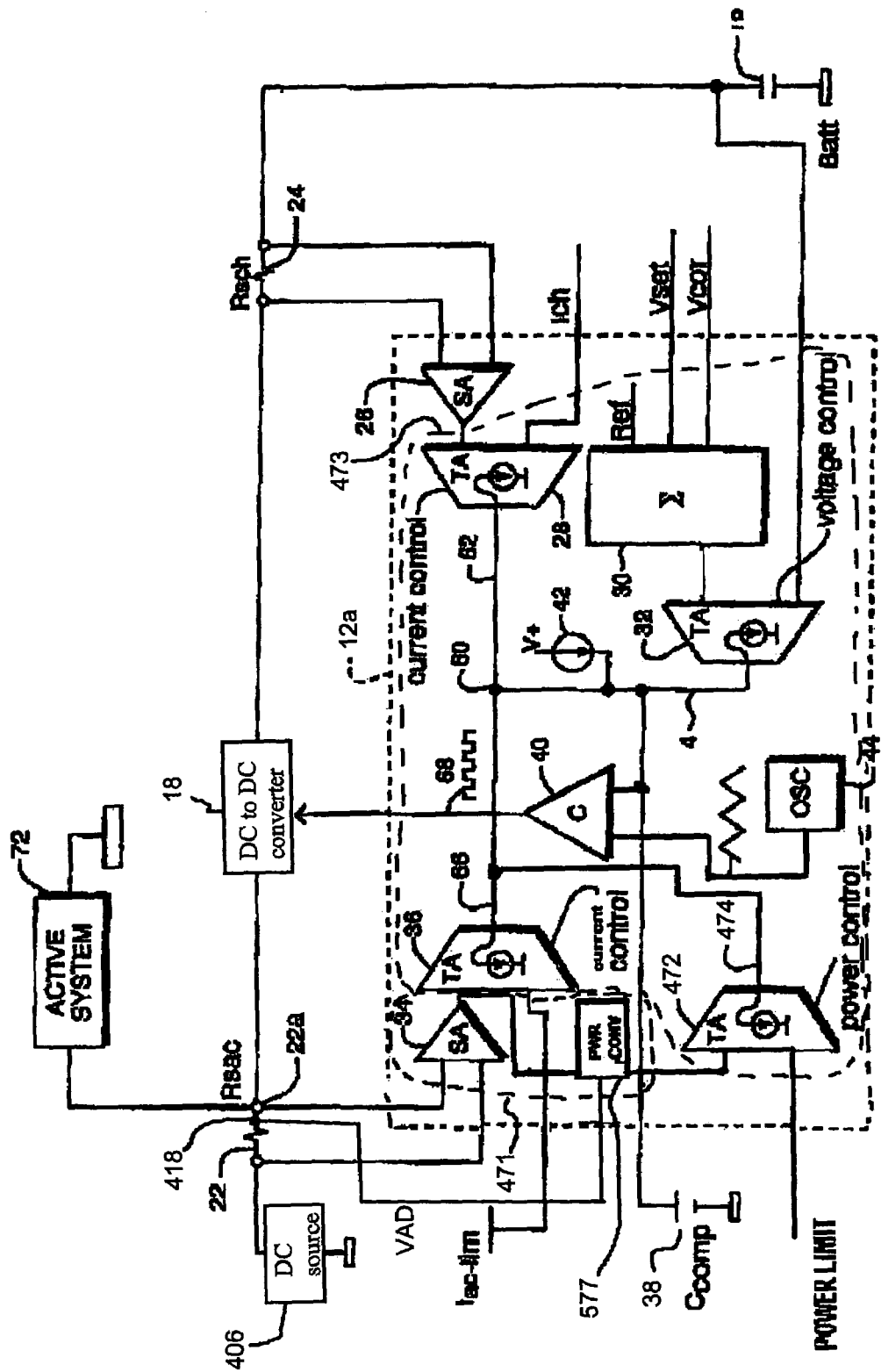
FIG. 5B is a more detailed block diagram of the control signal generating circuit portion of the power management circuit of FIG. 4B.

FIG. 5B illustrates another embodiment consistent with FIG. 4B where the power management circuit 12*a* provides a control signal to the DC to DC converter 18 to control a charging parameter provided to the rechargeable battery 16. The DC source 406 may have an output voltage level that varies over time as previously detailed regarding FIG. 4B. The control signal may be a PWM signal as previously detailed and the DC to DC converter 18 may be any variety of DC to DC converters known in the art. Other elements of FIG. 5B and operation thereof are similar to those elements previously detailed regarding FIG. 5A. Hence, similar circuit elements are labeled similarly and any repetitive description of the elements or operation thereof is omitted herein for clarity.

Figure 6:
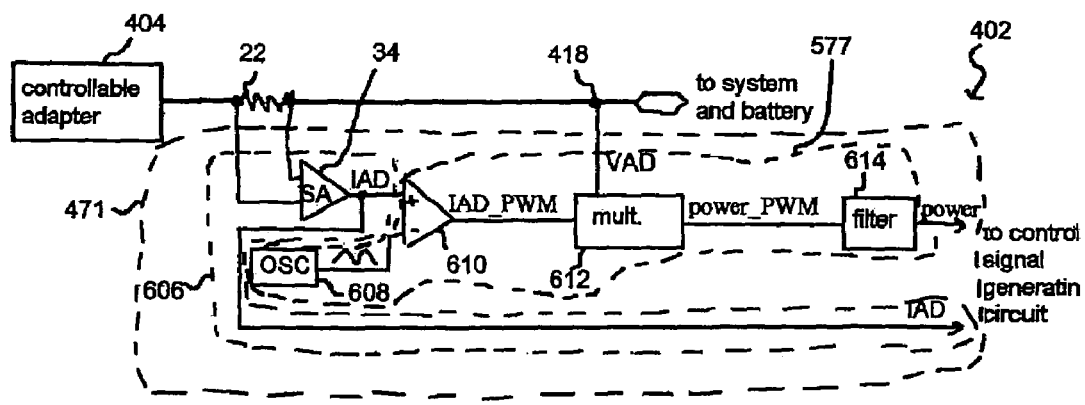
FIG. 6 is a more detailed block diagram of the power control circuit portion of the power management circuit of FIGS. 5A and 5B.

Turning to FIG. 6, more details of an exemplary power control circuit 471 and power conversion circuit 577 of FIGS. 5A and 5B are illustrated for providing the current signal to error amplifier 36 and power signal to error amplifier 472 of the control signal generating circuit 473. The power conversion circuit 577 may include classical configurations of analog or digital multiplier topologies. These approaches, however, may need trimming to achieve a desired accuracy. The power conversion circuit 577 may also include a ramp oscillator 608, a comparator 610, a multiplier 612, and a filter 614 as further detailed herein.

In general, the power control circuit 471 may include the sense amplifier 34 that monitors the voltage drop across sense resistor 22 and provides an IAD signal to the noninverting input terminal of the comparator 610. The IAD signal may be a DC voltage signal representative of the current from the DC source 404 or 406. A fixed frequency sawtooth signal may then be provided to the inverting input of the comparator 610 by a ramp oscillator 608. The output of the ramp oscillator 44 of the control signal generating circuit 473 may also be utilized to provide this signal to the comparator 610. As a result, the comparator 610 provides an adapter current pulse width modulated signal IAD_PWM where the pulse width or duty cycle is based on the value of the IAD signal.

The multiplier 612 multiplies the IAD_PWM signal with a VAD signal representative of the output voltage level of the DC source 404 or 406 to obtain a power_PWM signal. The power_PWM signal may be a pulse width modulated signal having a pulse width representative of the current output of the DC source 404 or 406 and having an amplitude representative of the voltage output of the DC source 404 or 406. As such, the power_PWM signal is representative of the instantaneous output power level of the DC source 404 or 406. The power_PWM signal may then be input to a filter 614 which in turn outputs a power signal having a DC voltage level. Such a power signal output from the filter 614 may then be provided to the error amplifier 472 of the control signal generating circuit 473. If the instantaneous output power level increases beyond the predetermined power threshold level, the error amplifier 472 would cause the comparator 40 provide a PWM signal to reduce a charging parameter provided to the battery. The PWM signal may be provided to the controllable DC source 404 or the DC to DC converter 18.

The power control circuit 471 may also include a current control circuit 606. The current control circuit 606 includes the sense amplifier 34 to provide the IAD signal to the control signal generating circuit 473. The control signal generating circuit 473 may have an error amplifier 36 to accept this IAD signal and compare it to a current threshold limit. If the output current level increases beyond a predetermined current limit, the control generating circuit 473 would provide a control signal to reduce a charging parameter, e.g., charging current, provided to the battery 16.

Figure 7:
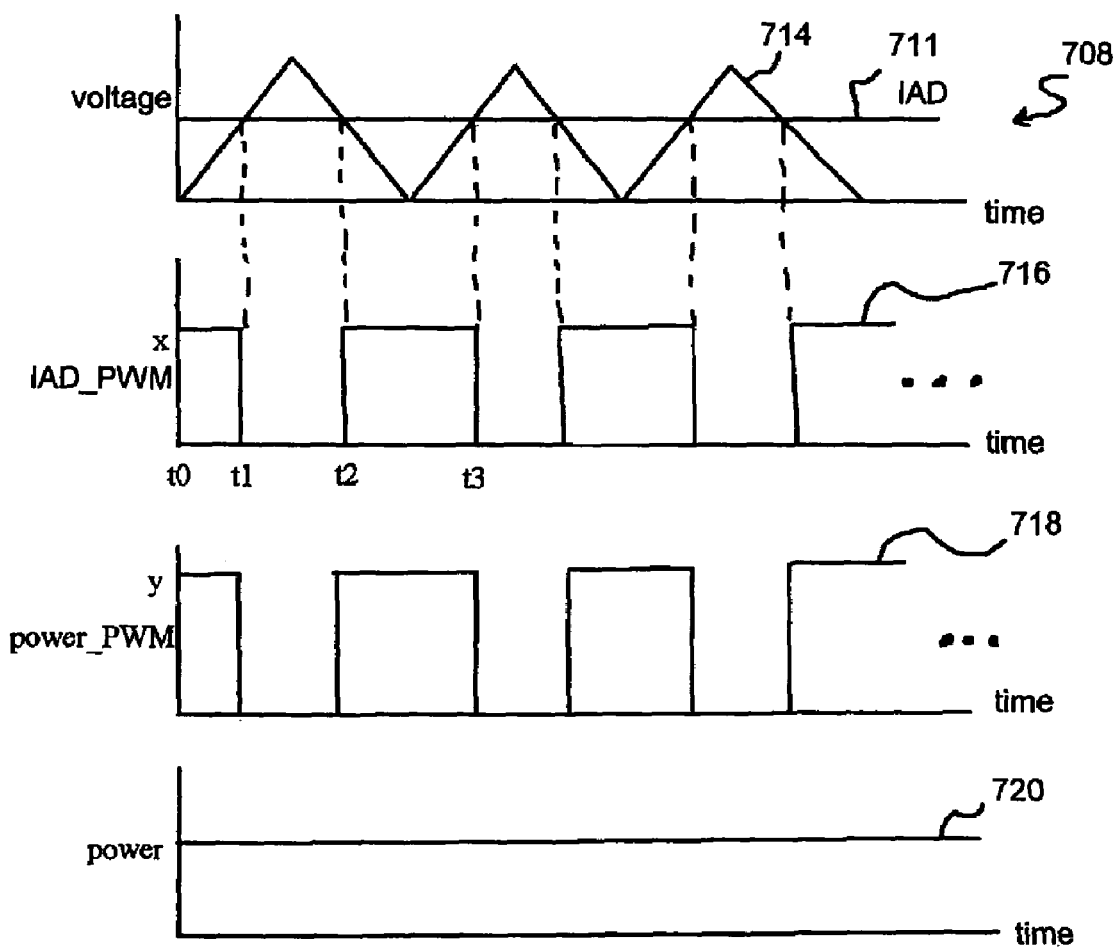
FIG. 7 is a plot of various signals versus time for the signals detailed in FIG. 6.

Turning to FIG. 7, plots of various signals over time are illustrated to further explain the operation of the power control circuit 471 of FIG. 6. The two input signals received by the comparator 610, or the IAD signal 711 and the sawtooth signal 714, are illustrated in graph 708. The sawtooth signal 714 may be a fixed frequency signal such that the intersection of the sawtooth signal 714 and the IAD signal 711 defines the pulse width or duty cycle of the resultant IAD_PWM signal 716. For instance, the time interval between time t1 and time t3 represents one period. The IAD_PWM signal 716 is at a digital zero between times t1 and t2 and a digital one between times t2 and t3. Hence, the time interval between times t2 and t3 defines the pulse width or duty cycle of the IAD_PWM signal 716 from the comparator 610.

As the IAD signal 711 increases from the position shown in graph 708, the pulse width of the resulting IAD_PWM signal 716 also increases. Similarly, as the IAD signal 711 decreases from the position shown in graph 708, the pulse width of the resulting IAD_PWM signal 716 also decreases. The amplitude of the IAD_PWM signal 716 has a nominal value x.

The IAD_PWM signal 716 is then input to the multiplier 612 and multiplied by a VAD signal representative of the voltage level of the DC source 404 or 406. As such, the output of the multiplier 612 or the power_PWM signal 718 results. The power_PWM signal 718 therefore has a pulse width representative of the current output level of the controllable adapter 404 and an amplitude y representative of the voltage output level of the controllable adapter 404. The power_PWM signal 718 may then be input to the filter 614 to provide the power signal 720 having a constant DC power level over time. This power signal may then be input to the control signal generating circuit 473, e.g., to an error amplifier 472 of this circuit 473.

Figure 8:
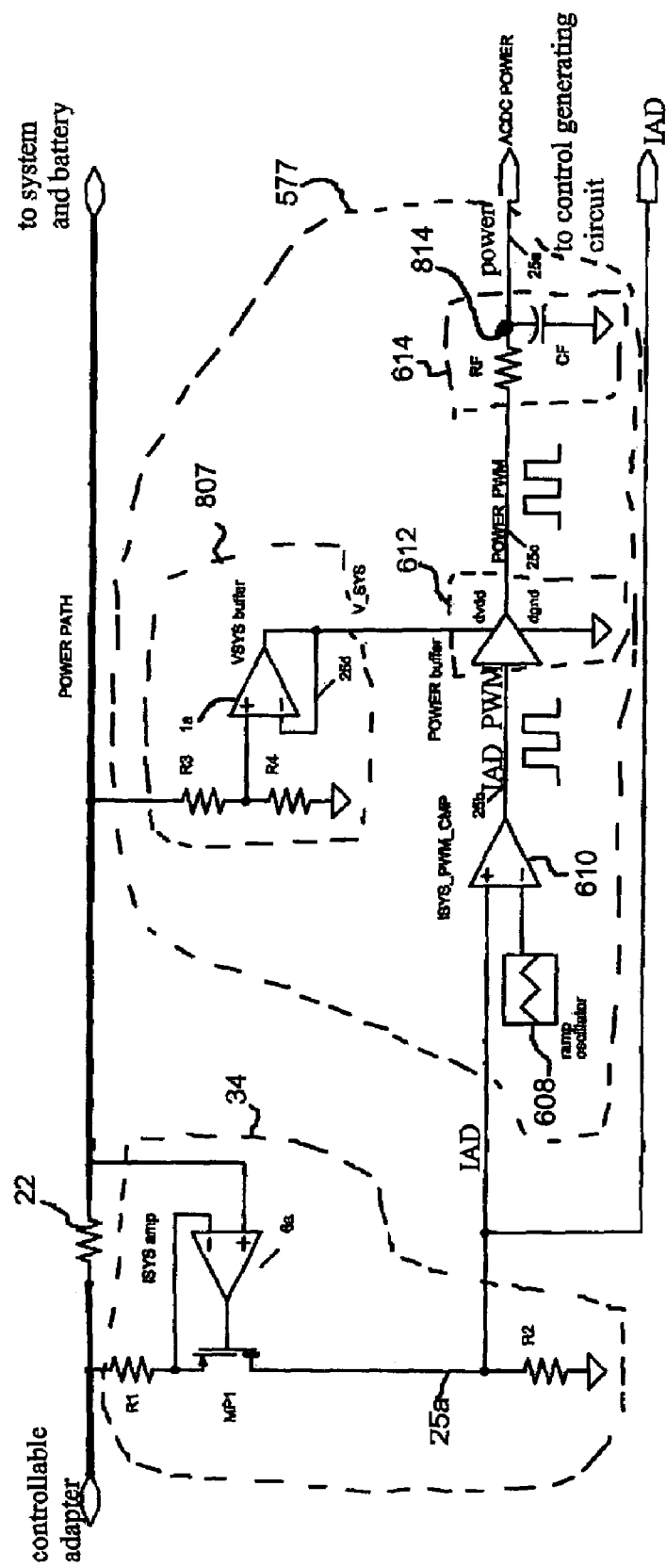
FIG. 8 is an exemplary circuit diagram of one embodiment of the power management circuit of FIG. 6.

Turning to FIG. 8, a detailed circuit diagram of one embodiment of the power management circuit consistent 12a with FIGS. 4A, 4B, 5A, 5B, 6 and 7 is illustrated. The components of FIG. 8 similar to earlier detailed components of FIG. 6 are labeled similarly. Hence, any repetitive description of such components is omitted herein for clarity.

The sense amplifier 34 may be any variety of sense amplifiers available in the art. In the embodiment of FIG. 8, the sense amplifier 34 includes a transistor MP1 controlled by an operational amplifier 6a, and gain resistors R1 and R2. Similar to the embodiment illustrated in FIG. 2, this sense amplifier 34 alleviates the requirement for large common mode voltage rejection. The sense amplifier 34 provides the IAD signal.

The voltage sampling circuit 807 may include a pair of resistors R3, R4 forming a voltage divider to provide a scaled down version of the output voltage of the controllable adapter to the noninverting input terminal of the operation amplifier 1a. The output of the operational amplifier 1a may be fed back to the inverting input terminal. Those skilled in the art will recognize a variety of voltage sampling circuits to provide the VAD signal to the multiplier 612.

The multiplier 612 may be a power buffer which effectively shifts the amplitude of the input IAD_PWM signal to an amplitude level representative of the voltage level of the controllable adapter. As such, the power_PWM signal is provided at the output of the power buffer. The filter 614 may be an RC filter having a resistor coupled in series with an input to the filter and a node 814. Coupled to the node 814 and ground may be a capacitor CF. The RC filter accepts the input power_PWM signal and provides the output power signal having a DC voltage value representative of the output power level of the DC source.

Figure 9:
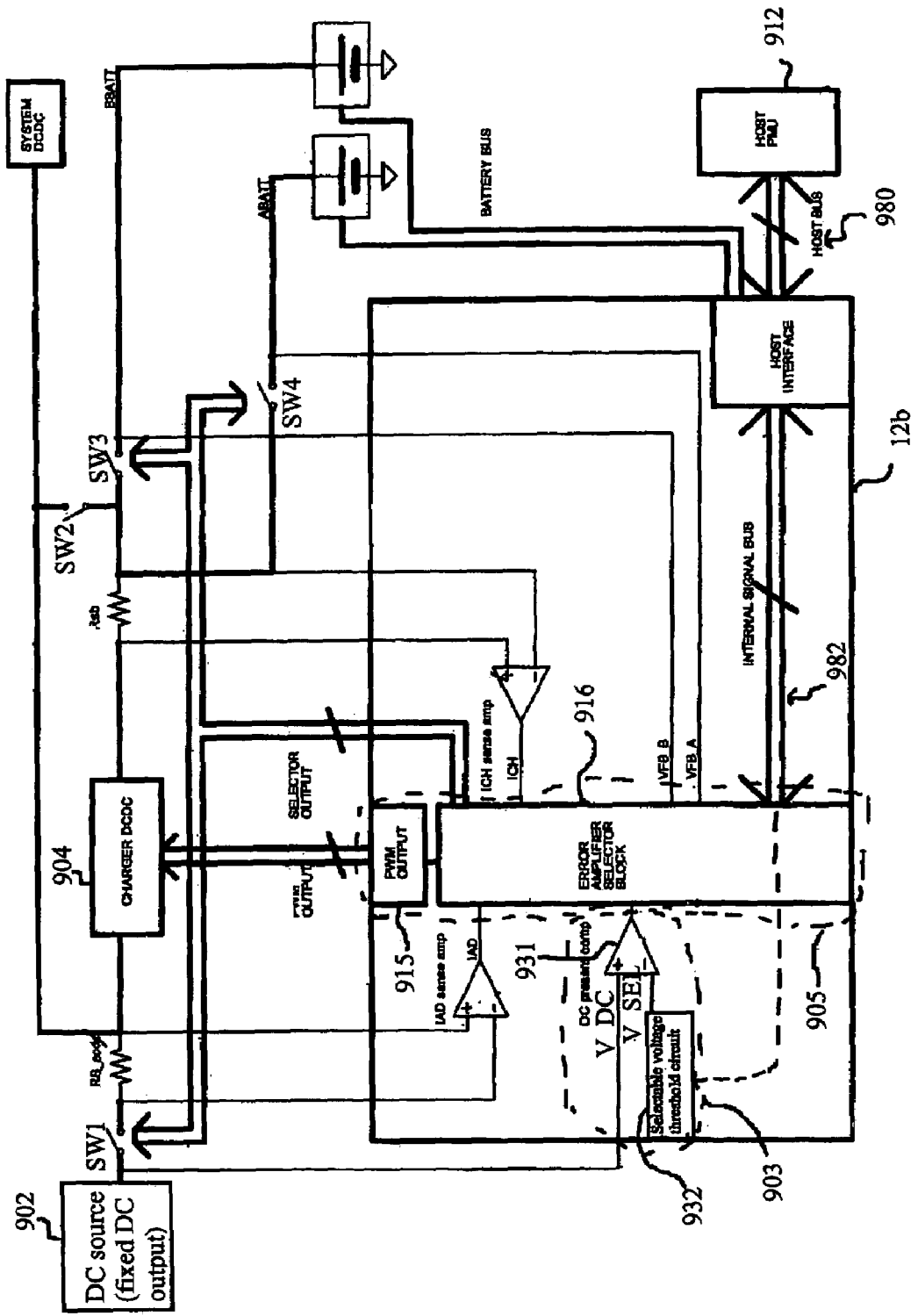
FIG. 9 is a diagram of an electronic device for use with a fixed voltage output DC source and having another power management circuit consistent with another embodiment of the invention having a presence circuit to compare the voltage level of the DC source with a selectable voltage threshold level.

Turning to FIG. 9, another embodiment of a power management circuit 12b is illustrated. The power management circuit 12b includes a presence circuit 903 configured to compare a voltage level of the DC source 902 with a selectable voltage threshold level as further detailed herein. In this way, a single power management circuit 12b may be used with a plurality of DC sources 902 having an associated plurality of fixed output voltage levels.

In general, the power management circuit 12b includes a control signal generating circuit 905 and a presence circuit 903. The control signal generating circuit 905 may include a plurality of error amplifiers in circuit 916 to compare signals with an associated threshold level for each monitored parameter similar to that previously detailed regarding the circuit 12 of FIG. 1. For instance, the plurality of error amplifiers may be configured as an analog "wired-OR" topology such that the error amplifier that first detects a condition exceeding the associated maximum level controls the command signal to the DC to DC converter 904. The control signal generating circuit may also include PWM circuitry 915 similar to that detailed in circuit 12 of FIG. 1 that provides a PWM control signal to the DC to DC converter 904. For instance, the duty cycle of the PWM control signal may be reduced to lessen an output power parameter of the DC to DC converter 904 if one of the error amplifiers detects a condition exceeding an associated maximum threshold level.

The control signal generating circuit 905 may also include selector circuitry in circuit 916 known in the art to provide a selector control signals to control, at least, the state of switches SW1, SW3, and SW4 based on various monitored conditions and/or commands from the host power management unit (PMU) 912.

The presence circuit 903 generally compares a voltage level of the DC source 902 with a selectable voltage threshold level. The DC source 902 may be any variety of DC sources providing a fixed output voltage level, e.g., an ACDC adapter with a fixed DC output voltage. Any plurality of DC sources may be utilized providing an associated plurality of fixed output DC voltage levels. For example, one ACDC adapter may provide a 15 volt DC output while another ACDC adapter may provide a 20 volt DC output. The selected voltage threshold level V_SEL is selected based on the expected fixed output voltage level of the particular DC source 902. The selected voltage threshold level V_SEL may typically be a nominal value less than the expected output voltage level. Therefore, if the DC source is present and providing a satisfactory voltage level relative to its expected fixed voltage level, the comparison will provide a signal indicative of this case.

To perform this comparison, the presence circuit 903 may include a comparator 931 accepting a voltage signal V_DC representative of the voltage level of the DC source 902 at its noninverting input terminal. The comparator 931 may also accept the selectable voltage threshold level V_SEL at its inverting input terminal. If the voltage level of the DC source exceeds the selected threshold level, the comparator provides a digital one output signal to the control signal generating circuit 905 indicating that the DC source 902 is present and providing a satisfactory output voltage.

The selectable voltage threshold level may be selected and provided to the comparator 931 in a variety of ways. For instance, a selectable threshold voltage circuit 932 may provide the selectable threshold voltage level. Turning to FIG. 10A, the selectable threshold voltage circuit 932 may include a resistor network 1004 configured to receive a reference voltage level V_REF and provide the selected threshold voltage level V_SEL. The resistor network 1004 may include one or more resistors arranged in a variety of ways know in the art, e.g., a voltage divider, to achieve a desired or selected threshold voltage level. Alternatively, the resistor network 1004 may include at least one trimmable resistive element that is trimmable to a desired resistive value. The resistive element may be trimmed by any variety of ways known to those skilled in the art, e.g., laser trimming, such that the resistive network 1002, in combination with the received reference voltage V_REF, then provides a desired threshold voltage level.

Alternatively, the selectable threshold voltage circuit 932 may include a memory element 1006 as illustrated in FIG. 10B. The memory element 1006 may be any variety of memory element that stores digital information such as, but not limited to, random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), and optical disk (e.g. CD-ROM). The memory element 1006 may be a one time programmable memory element or may be able to programmed a plurality of times depending on the type of memory utilized and access to the memory element for additional programming. Once a programmed value of a desired analog threshold voltage level is stored in memory, a digital to analog converter (DAC) 1008 may be utilized to convert the stored digital signal into an analog voltage signal representative of the selected voltage threshold level V_SEL.

Further yet, the selected voltage threshold level V_SEL may alternatively be selected by the host PMU 912 via instructions provided to the power management circuit 12b via the host bus 980. The host interface 913 of the power management circuit 12b may provide signals via the internal signal bus 982 to the selectable voltage threshold circuit 932 such that the desired threshold level may be dynamically programmable by the host PMU 912.

There is thus provided a circuit for controlling a charging parameter provided to a rechargeable battery. The circuit includes a power control circuit configured to provide a power control signal representative of a power output level of a DC source, and a control signal generating circuit configured to reduce the charging parameter provided to the battery if the power output level exceeds a predetermined power threshold level.

There is thus also provided another circuit including a presence circuit configured to compare a voltage level of a DC source having a fixed output voltage level with a selectable voltage threshold level and to provide a presence signal representative of a presence of the DC source if the voltage level exceeds the selectable threshold voltage level. This circuit may also include a control signal generating circuit configured to receive at least the presence signal and further configured to provide a control signal in response to at least the presence signal.

Those skilled in the art will recognize numerous modifications to the present invention. These and all other modifications as may be apparent to one skilled in the art are deemed within the spirit and scope of the present invention, only as limited by the appended claims.

What is claimed is:

1. A circuit for controlling a charging parameter provided to a rechargeable battery, said circuit comprising: a power control circuit configured to provide a power control signal representative of a power output level of a DC source, said power control circuit comprising a first path configured to provide a first signal representative of a current level output of said DC source, a second path configured to provide a second signal representative of a voltage level output of said DC source, and a power conversion circuit configured to accept said first and second signal and provide said power control signal in response to said first and second signal, said power conversion circuit comprising a multiplier coupled to said first path and second path, said multiplier configured to accept said first signal and said second signal and provide a third signal, said third signal based on a product of said first and second signal, wherein said power control signal is based on said third signal; and a control signal generating circuit configured to reduce said charging parameter provided to said battery if said power output level exceeds a predetermined power threshold level.

2. The circuit of claim 1, further comprising a current control circuit configured to provide a current control signal representative of a current output level of a DC source, and wherein said control signal generating circuit is further configured to compare said current control signal with a current threshold signal representative of a current threshold level, and wherein said control signal generating circuit is further configured to reduce said charging parameter provided to said battery if said current output level exceeds said current threshold level.

3. The circuit of claim 1, wherein said first signal comprises a current pulse width modulated signal having a pulse width representative of said current level output of said DC source and wherein said second signal comprises a DC voltage signal having a DC voltage level representative of said voltage level output of said DC source, and wherein said multiplier provides said third signal, said third signal a power pulse width modulated signal having a pulse width representative of said current level output and an amplitude representative of said voltage level output.

4. The circuit of claim 3, wherein said first path comprises: a sense amplifier configured to provide a voltage signal representative of said current level output of said DC source; and a comparator configured to accept a sawtooth signal and said voltage signal representative of said current level output of said DC source, said comparator configured to provide said current pulse width modulated signal, said current pulse width modulated signal having a pulse width based on an intersection of said sawtooth signal with said voltage signal.

5. The circuit of claim 4, wherein said comparator provides said current pulse width signal having a first pulse width in response to said voltage signal representative of said current level at a first level, and wherein said comparator provides said current pulse width modulated signal having a second pulse width in response to said voltage signal representative of said current level at a second level, wherein said first pulse width is greater than said second pulse width if said first level is greater than said second level.

6. The circuit of claim 3, wherein said power conversion circuit comprises a filter configured to accept said third signal and provide said power signal.

7. The circuit of claim 6, wherein said filter comprises an RC circuit.

8. The electronic device of claim 1, wherein said power conversion circuit comprises a filter configured to accept said third signal and provide said power signal.

9. The circuit of claim 8, wherein said filter comprises an RC circuit.

10. An electronic device comprising a circuit to control a charging parameter provided to a rechargeable battery, said circuit comprising: a power control circuit configured to provide a power control signal representative of a power output level of a DC source, said power control circuit comprising a first path configured to provide a first signal representative of a current level output of said DC source, a second path configured to provide a second signal representative of a voltage level output of said DC source, and a power conversion circuit configured to accept said first and second signal and provide said power control signal in response to said first and second signal, said power conversion circuit comprising a multiplier coupled to said first path and second path, said multiplier configured to accept said first signal and said second signal and provide a third signal, said third signal based on a product of said first and second signal, wherein said power control signal is based on said third signal; and a control signal generating circuit configured to reduce said charging parameter provided to said battery if said power output level exceeds a predetermined power threshold level.

11. The electronic device of claim 10, said circuit further comprising a current control circuit configured to provide a current control signal representative of a current output level of said DC source, and wherein said control signal generating circuit is further configured to compare said current control signal with a current threshold signal representative of a current threshold level, and wherein said control signal generating circuit is further configured to reduce said charging parameter provided to said battery if said current output level exceeds said current threshold level.

12. The electronic device of claim 10, wherein said first signal comprises a current pulse width modulated signal having a pulse width representative of said current level output of said DC source and wherein said second signal comprises a DC voltage signal having a DC voltage level representative of said voltage level output of said DC source, and wherein said multiplier provides said third signal, said third signal a power pulse width modulated signal having a pulse width representative of said current level output and an amplitude representative of said voltage level output.

13. The electronic device of claim 12, wherein said first path comprises: a sense amplifier configured to provide a voltage signal representative of said current level output of said DC source; and a comparator configured to accept a sawtooth signal and said voltage signal representative of said current level output of said DC source, said comparator configured to provide said current pulse width modulated signal, said current pulse width modulated signal having a pulse width based on an intersection of said sawtooth signal with said voltage signal.

14. The electronic device of claim 13, wherein said comparator provides said current pulse width signal having a first pulse width in response to said voltage signal representative of said current level at a first level, and wherein said comparator provides said current pulse width modulated signal having a second pulse width in response to said voltage signal representative of said current level at a second level, wherein said first pulse width is greater than said second pulse width if said first level is greater than said second level.

15. A method comprising: monitoring an output power level of a DC source, said monitoring comprising monitoring a current output level of said DC source: providing a pulse width modulated signal having a pulse width representative of said current output level; monitoring a voltage output level of said DC source; providing a DC voltage signal having an amplitude representative of said voltage output level; multiplying said pulse width modulated signal and said DC voltage signal to obtain a third pulse width modulated signal having a pulse width representative of said current output level and having an amplitude representative of said voltage output level; and filtering said third signal to obtain a fourth signal representative of said output power level of said DC source; comparing said output power level to a threshold power level; and reducing a charging parameter provided to a rechargeable battery if said output power level exceeds said threshold power level.

16. The method of claim 15, wherein said monitoring step comprises: monitoring a current output level of said DC source; monitoring a voltage output level of said DC source; and multiplying said current output level by said voltage output level to obtain said output power level of said DC source.

* * * * *

UNITED STATES PATENT AND TRADEMARK OFFICE
CERTIFICATE OF CORRECTION

PATENT NO. : 7,202,634 B2
APPLICATION NO. : 10/757871
DATED : April 10, 2007
INVENTOR(S) : Bucur It is certified that error appears in the above-identified patent and that said Letters Patent is hereby corrected as shown below:

In column 14, line 25, in Claim 15, delete "source:" and insert
-- source; --, therefor.

Signed and Sealed this

Twenty-ninth Day of July, 2008

JON W. DUDAS
*Director of the United States Patent and Trademark Office*